United States Patent
Bao et al.

(10) Patent No.: US 12,540,683 B2
(45) Date of Patent: Feb. 3, 2026

(54) FLOW CONTROL VALVE

(71) Applicant: Danfoss A/S, Nordborg (DK)

(72) Inventors: Jinfeng Bao, Nordborg (DK); Jiang Wu, Nordborg (DK); Anders Pedersen, Middelfart (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/561,020

(22) PCT Filed: May 9, 2022

(86) PCT No.: PCT/CN2022/091748
§ 371 (c)(1),
(2) Date: Nov. 15, 2023

(87) PCT Pub. No.: WO2022/242494
PCT Pub. Date: Nov. 24, 2022

(65) Prior Publication Data
US 2024/0255066 A1 Aug. 1, 2024

(30) Foreign Application Priority Data

May 17, 2021 (CN) .......................... 202110537390.6

(51) Int. Cl.
*F16K 27/02* (2006.01)
*F16K 1/36* (2006.01)
*F16K 1/42* (2006.01)

(52) U.S. Cl.
CPC .............. *F16K 27/029* (2013.01); *F16K 1/36* (2013.01); *F16K 1/42* (2013.01)

(58) Field of Classification Search
CPC .... F16K 27/029; F16K 27/02; F16K 27/0254; F16K 1/36; F16K 1/42; F16K 1/38;
(Continued)

(56) References Cited

U.S. PATENT DOCUMENTS

| 3,695,577 A | 10/1972 | Jespersen |
| 2009/0293520 A1* | 12/2009 | Hayashi ................. F25B 41/38 62/324.6 |

(Continued)

FOREIGN PATENT DOCUMENTS

| CN | 2898477 Y | 5/2007 |
| CN | 102853128 A | 1/2013 |

(Continued)

OTHER PUBLICATIONS

International Search Report mailed on Jul. 29, 2022, in connection with corresponding International Application No. PCT/CN2022/091748 (6 pp., including machine-generated English translation).

(Continued)

*Primary Examiner* — Patrick C Williams
(74) *Attorney, Agent, or Firm* — McCormick, Paulding & Huber PLLC

(57) ABSTRACT

A flow control valve (1) includes a valve body (2), which is provided with a valve hole (21), a guide hole (22) and a lateral hole (23) that are in communication with each other, and a valve core (3), which is located in the guide hole (22), and can move in an axial direction of the guide hole (22) to control the opening and closing of the valve hole (21), thereby allowing or blocking the flowing of a fluid between the valve hole (21) and the lateral hole (23). The lateral hole (23) is internally provided with a connecting portion (231) connected to the valve hole (21), and the connecting portion (231) has a borehole surface (232) bored around an axis of the valve hole (21). The valve body (2) of the flow control valve (1) is provided with the lateral hole (23) and the borehole surface (232) located in the lateral hole (23), and the borehole surface (232) is located at a joint between the lateral hole (23) and the valve hold (21) and is arranged around the axis of the valve hole (21). By means of the lateral bore (23) and the borehole surface (232), the valve (Continued)

core (3) of the flow control valve (1) has as little lateral force as possible when a fluid flows between the valve hole (21) and the lateral hole (23).

16 Claims, 4 Drawing Sheets

(58) Field of Classification Search
CPC ... F16K 1/00; F16K 1/52; F16K 39/02; F16K 21/00; F16K 31/04; F16K 31/06
See application file for complete search history.

(56) References Cited

U.S. PATENT DOCUMENTS

| | | | |
|---|---|---|---|
| 2011/0012039 A1* | 1/2011 | Zhan | F16K 31/04 251/129.01 |
| 2014/0103235 A1 | 4/2014 | Xu et al. | |
| 2015/0020540 A1* | 1/2015 | Wakisaka | F16K 31/04 62/528 |
| 2015/0136260 A1* | 5/2015 | Zhan | F25B 41/38 137/630.12 |
| 2018/0363785 A1* | 12/2018 | Lin | F16K 1/54 |
| 2019/0178404 A1* | 6/2019 | Zhang | F25B 49/00 |

FOREIGN PATENT DOCUMENTS

| | | |
|---|---|---|
| CN | 109139941 A | 1/2019 |
| CN | 208431397 U | 1/2019 |
| CN | 109578659 A | 4/2019 |
| CN | 209012455 U | 6/2019 |
| CN | 105889597 B | 1/2020 |
| CN | 111609146 A | 9/2020 |
| CN | 112524310 A | 3/2021 |
| CN | 212899738 U | 4/2021 |
| CN | 217927149 U | 11/2022 |
| JP | 2007032863 A | 2/2007 |
| JP | 2014-035006 A | 2/2014 |
| JP | 2015143543 A | 8/2015 |

OTHER PUBLICATIONS

Extended European Search Report for European Patent Application No. / Patent No. 22803816.2 - 1015 / 4343180 PCT/CN2022091748, dated Mar. 14, 2025.

* cited by examiner

FLOW CONTROL VALVE

CROSS-REFERENCE TO RELATED APPLICATIONS

This application is a National Stage application of International Patent Application No. PCT/CN2022/091748, filed on May 9, 2022, which claims priority to Chinese Patent Application No. 202110537390.6, filed on May 17, 2021, each of which is hereby incorporated by reference in its entirety.

TECHNICAL FIELD

The field of fluid control, in particular relating to a flow control valve.

BACKGROUND

Flow control valves are widely used in the technical field of fluid control. Under the driving action of an actuator, the valve core of a flow control valve can open or close a valve port, so as to achieve opening/closing of the flow control valve or flow regulation control.

After the valve port opens, fluid can circulate between an inlet and an outlet through the valve port and a gap between the valve core and the valve body. When fluid circulates in an existing flow control valve, the configuration of the flow path thereof results in the fluid having non-uniform flow speed around the valve core, especially in the case where the fluid enters through a bottom port and exits through a side port. This will result in the fluid exerting a radial imbalance force, called a lateral force, on the valve core. The presence of the lateral force will cause axial frictional resistance when the valve core moves; this frictional resistance results in the flow control valve requiring a greater driving force from the actuator, and may even cause jamming of the valve core, with the result that the service life of the flow control valve is not long.

SUMMARY

To solve the abovementioned problem, the present application provides a flow control valve, comprising: a valve body, having a valve hole, a guide hole and a lateral hole which are in communication with each other; a valve core, located in the guide hole, and movable in the axial direction of the guide hole so as to control the opening/closing of the valve hole, thereby allowing or blocking the flow of fluid between the valve hole and the lateral hole; a connecting portion connected to the valve hole being provided in the lateral hole, the connecting portion having a borehole surface formed by boring about the axis of the valve hole.

Optionally, the valve hole comprises a cylindrical portion and a conical portion, the conical portion extending from the cylindrical portion to the connecting portion in a direction away from the axis of the valve hole.

Optionally, a seating face for the valve core is located at the conical portion.

Optionally, the conical portion comprises a first conical part, a second conical part and a third conical part, which are connected to each other in sequence starting at the cylindrical portion and have gradually increasing diameters, wherein the first conical part forms the seating face for the valve core; the angle between the second conical part and the axis of the valve hole is smaller than the angle between the third conical part and the axis of the valve hole, so as to provide different circulation areas at different degrees of opening of the valve core; and the diameter of the end of the third conical part which is opposite the second conical part is equal to the diameter of the borehole surface.

Optionally, the lateral hole is a blind hole, and the ratio of the radius of the blind hole to the radius of the cylindrical portion is 1.4-2.

Optionally, the ratio of the radius of the blind hole to the radius of the cylindrical portion is 1.4-1.7.

Optionally, the blind hole comprises a columnar part, and the ratio of the distance between the bottom of the columnar part and the axis of the valve hole to the radius of the cylindrical portion is 1.4-2.5.

Optionally, the ratio of the distance between the bottom of the columnar part and the axis of the valve hole to the radius of the cylindrical portion is 1.8-2.0.

Optionally, the ratio of the borehole radius corresponding to the borehole surface to the radius of the cylindrical portion is 1.3-2.

Optionally, the ratio of the borehole radius corresponding to the borehole surface to the radius of the cylindrical portion is 1.35-1.45.

Optionally, an annular flow-expanding groove arranged around the axis of the valve hole is provided on a sidewall of the valve core.

Optionally, the ratio of the radius of the valve core at the annular flow-expanding groove to the radius of the cylindrical portion is 0.65-0.9.

Optionally, the axis of the valve hole is perpendicular to the axis of the lateral hole.

In embodiments of the present application, the lateral hole and the borehole surface located in the lateral hole are provided in the valve body of the flow control valve, the borehole surface being located at the junction of the lateral hole and the valve hole and arranged around the axis of the valve hole. Due to the lateral hole and the borehole surface, the valve core of the flow control valve has as small a lateral force as possible when fluid is flowing between the valve hole and the lateral hole, and the service life of the flow control valve is thereby extended.

BRIEF DESCRIPTION OF THE DRAWINGS

The present application is described in more detail below, based on exemplary embodiments in conjunction with the drawings, to facilitate understanding of the present application. In the drawings, identical or similar reference labels are used to indicate identical or similar members. It should be understood that the drawings are merely schematic, and the dimensions and proportions of members therein are not necessarily precise.

DETAILED DESCRIPTION

Figure 1:
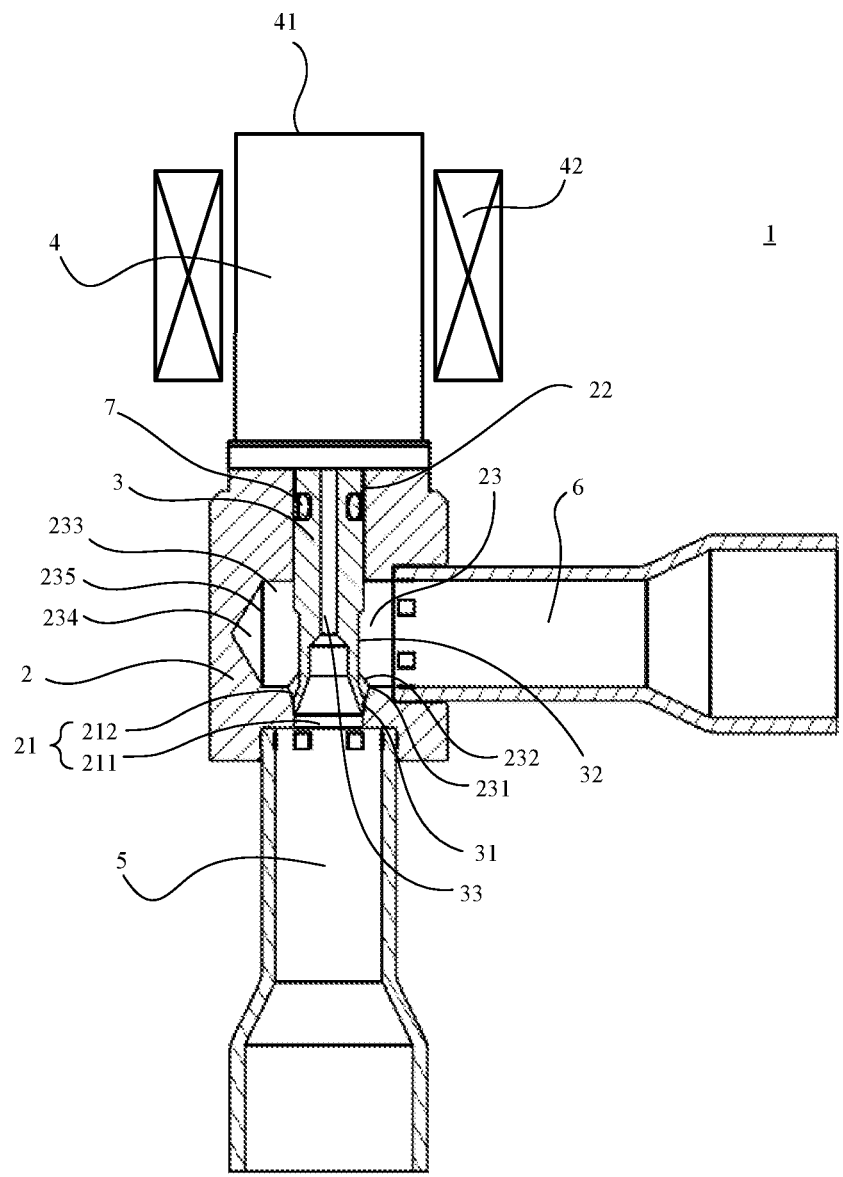
FIG. 1 is a longitudinal sectional view of the flow control valve provided in embodiments of the present application, in a closed-valve state.

Embodiments of the flow control valve of the present application are described below with reference to the drawings. The concept of "top/bottom" herein corresponds to top/bottom in the drawings.

When fluid circulates in an existing flow control valve, the configuration of the flow path thereof results in the fluid having non-uniform flow speed around the valve core. Especially in the case where the fluid enters through a bottom port and exits through a side port, the nonuniformity of flow speed will result in the fluid exerting a radial imbalance force (which may also be called a lateral force) on the valve core. The presence of the lateral force will cause axial frictional resistance when the valve core moves; this frictional resistance results in the flow control valve requiring a greater driving force from the actuator, and may even cause jamming of the valve core, with the result that the service life of the flow control valve is not long.

To solve the abovementioned problem, embodiments of the present application provide a flow control valve 1, which is a pressure balancing flow control valve. As shown in FIG. 1, the flow control valve 1 may comprise a valve body 2, a valve core 3 and an actuating part 4.

Figure 2:
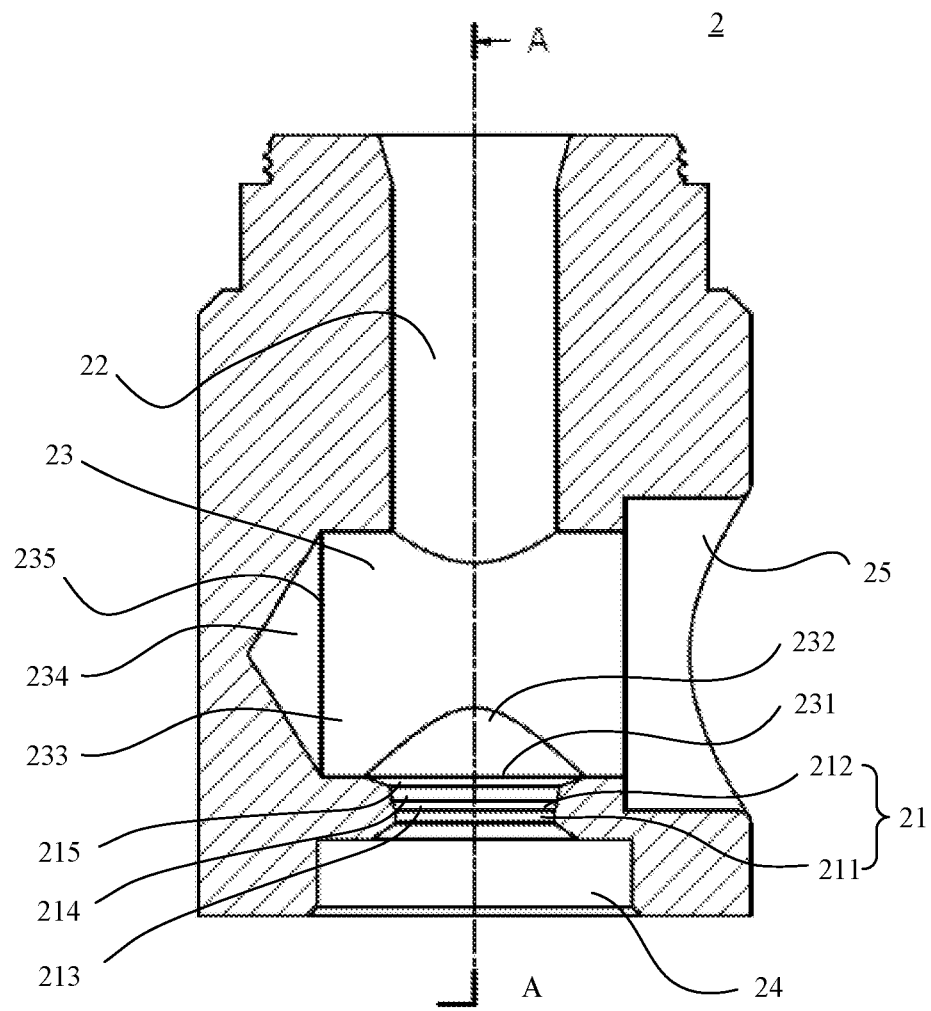
FIG. 2 is a longitudinal sectional view of the valve body in FIG. 1.
Figure 3:
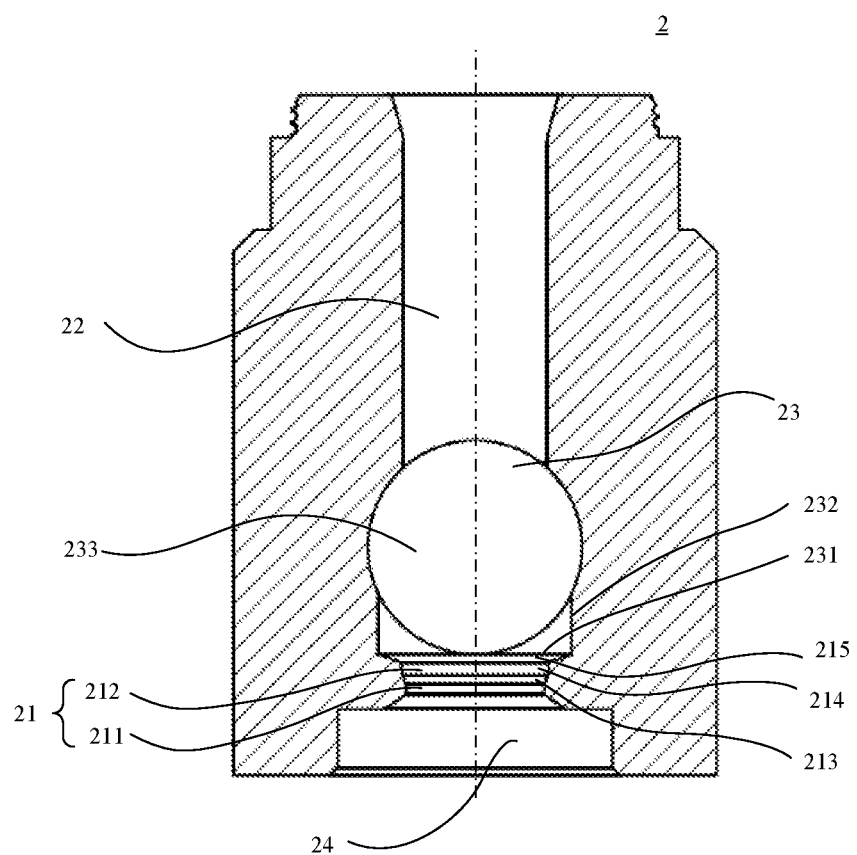
FIG. 3 is a sectional view along A-A in FIG. 2.
Figure 4:
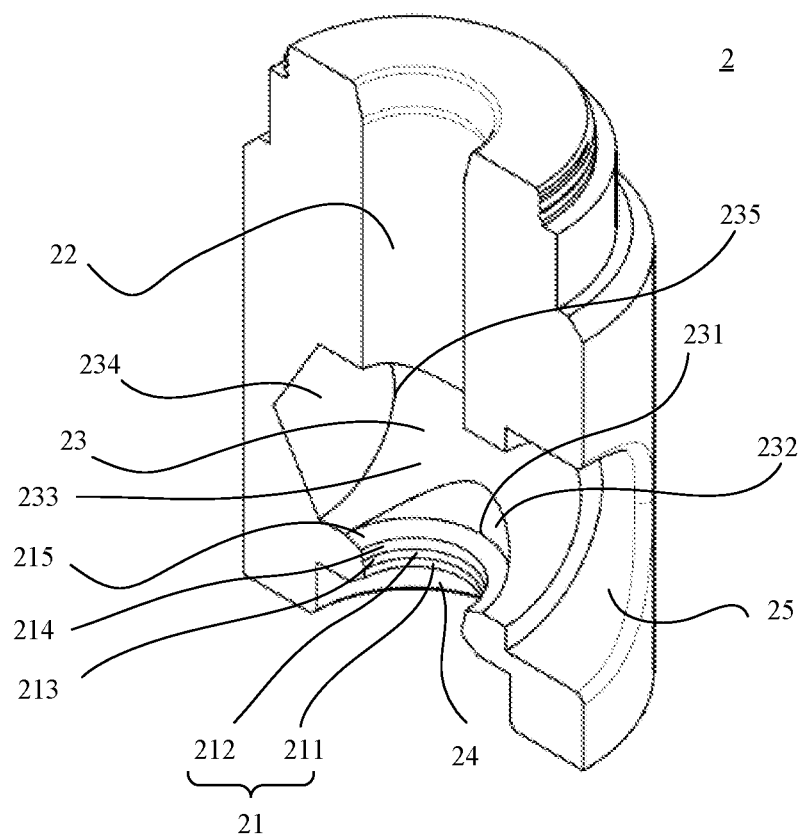
FIG. 4 is an axonometric drawing of the longitudinal sectional view of the valve body in FIG. 1.

FIGS. 2-4 clearly show that the valve body 2 is integrally provided with a valve hole 21, a guide hole 22 and a lateral hole 23. That is, the valve hole 21, guide hole 22 and lateral hole 23 are all formed by a valve body component, without comprising other separate components. The guide hole 22 may be in communication with the valve hole 21 via the lateral hole 23, and the guide hole 22 is coaxial with the valve hole 21. The valve hole 21 comprises a cylindrical portion 211 and a conical portion 212, the cylindrical portion 211 forming a valve port. A first installation hole 24 is provided at a lower end of the cylindrical portion 211 forming the valve port on the valve body 2. The lateral hole 23 may also be called a valve chamber, and a second installation hole 25 may be provided at a side end of the lateral hole 23.

Continuing to refer to FIG. 1, the valve core 3 is located in the guide hole 22, and is movable in the axial direction of the guide hole 22 so as to abut or move away from the conical portion 212 through the lateral hole 23, and can thus control the opening/closing of the valve port formed by the cylindrical portion 211.

The actuating part 4 may comprise a housing 41 and a stator 42 disposed outside the housing 41; the housing 41 and the valve body 2 form a closed chamber (not shown in the figures) in which a rotor is arranged, the rotor being used to drive the valve core 3 to move in the axial direction of the guide hole 22. The actuating part is common in the art, so a detailed description thereof is omitted. When the actuating part 4 drives the valve core 3 to abut the conical portion 212, the valve port formed by the cylindrical portion 211 is in a closed-valve state so as to block the flow of fluid between the valve hole 21 and the lateral hole 23. When the actuating part 4 drives the valve core 3 to move away from the conical portion 212, the valve port formed by the cylindrical portion 211 is in an open-valve state so as to allow the flow of fluid between the valve hole 21 and the lateral hole 23, and the degree of opening of the valve core 3 can control the flow rate of the fluid.

In addition, in some embodiments, as shown in FIG. 1, a first connector tube 5 is provided in the first installation hole 24, and a second connector tube 6 is provided in the second installation hole 25. When the second connector tube 6 acts as an inlet tube and the first connector tube 5 acts as an outlet tube, the flow direction of fluid is a first flow direction. When the first connector tube 5 acts as an inlet tube and the second connector tube 6 acts as an outlet tube, the flow direction of fluid is a second flow direction.

As clearly shown in FIGS. 2-4, a connecting portion 231 connected to the valve hole 21 is provided in the lateral hole 23 of the valve body 2, the connecting portion 231 having a borehole surface 232 formed by boring about the axis of the valve hole 21.

In embodiments of the present application, due to the fact that the lateral hole 23 and the borehole surface 232 located in the lateral hole 23 are provided on the valve body 2, the fluid flow speed can be homogenized when the valve core 3 switches from the closed-valve state to the open-valve state, so that the valve core 3 of the flow control valve has as small a lateral force as possible, in order to extend the service life of the flow control valve. The effect of this homogenization of flow speed minimizing the lateral force of the valve core 3 is most pronounced in the case of the second flow direction mentioned above.

As shown in FIGS. 2-4, the valve hole 21 may comprise the cylindrical portion 211 and the conical portion 212, the cylindrical portion 211 forming the valve port, the conical portion 212 extending from the cylindrical portion 211 to the connecting portion 231 in a direction away from the axis of the valve hole 21, and a seating face for the valve core 3 being located on the conical portion 212. The provision of the conical portion 212 of the valve hole 21 enables linear adjustment of the fluid flow rate when the valve core 3 opens.

No specific restrictions are imposed on the structure of the conical portion 212 in embodiments of the present application. In an embodiment, the conical portion 212 may have a single cone angle; such a conical portion 212 is structurally simple, and relatively convenient to process. In another embodiment, as shown in FIGS. 2-4, the conical portion 212 may comprise a first conical part 213, a second conical part 214 and a third conical part 215, which are connected to each other in sequence starting at the cylindrical portion 211 and have gradually increasing diameters, wherein the first conical part 213 forms the seating face for the valve core 3. The second conical part 214 and the third conical part 215 can control the valve core 3 to provide different flow rates at different degrees of opening. For example, the angle between the second conical part 214 and the axis of the valve hole 21 may be smaller than the angle between the third conical part 215 and the axis of the valve hole 21. Furthermore, the diameter of the end of the third conical part 215 which is opposite the second conical part 214 may be set equal to the diameter of the borehole surface 232. Via such a configuration, it is possible to ensure that the flow control valve 1 can provide different circulation areas at different degrees of opening of the valve core 3, while also enabling the fluid flow speed to be homogenized as much as possible so as to further reduce the fluid lateral force exerted on the valve core 3.

No specific restrictions are imposed on the extension direction and specific dimensions of the lateral hole 23 in embodiments of the present application. In an embodiment, as shown in FIGS. 2-3, the axis of the lateral hole 23 is perpendicular to the axis of the valve hole 21, and the lateral hole 23 is a blind hole. The ratio of the radius of the blind hole to the radius of the cylindrical portion 211 is 1.4-2. Preferably, the ratio of the radius of the blind hole to the radius of the cylindrical portion 211 is 1.4-1.7. Generally, after being machined, the blind hole comprises a columnar part 233 and a tapered part 234, and the junction between the columnar part 233 and the tapered part 234 may be called the hole bottom 235 (or the bottom of the columnar part 233). The ratio of the distance between the hole bottom 235 and the axis of the valve hole 21 to the radius of the cylindrical portion 211 is 1.4-2.5. Preferably, the ratio of the distance between the hole bottom 235 and the axis of the valve hole 21 to the radius of the cylindrical portion 211 is 1.8-2.0. The above-described configuration of the lateral hole 23 enables the flow speed of the fluid to be further homogenized when it circulates through the lateral hole, and the fluid lateral force exerted on the valve core 3 can thus be reduced. In particular, in embodiments of the present application, the ratio of the radius of the blind hole to the radius of the cylindrical portion 211 is 1.54. The ratio of the distance between the hole bottom 235 of the lateral hole 23 and the axis of the valve hole 21 to the radius of the cylindrical portion 211 is 1.9.

No specific restrictions are imposed on diameter of the borehole surface 232 in embodiments of the present application. For example, the ratio of the borehole radius corresponding to the borehole surface 232 to the radius of the cylindrical portion 211 is 1.3-2. Preferably, the ratio of the borehole radius corresponding to the borehole surface 232 to the radius of the cylindrical portion 211 is 1.35-1.45. The configuration of the diameter of the borehole surface 232 in conjunction with the above-described configuration of the valve hole 21 and the lateral hole 23 enable the flow speed of the fluid of the flow control valve to be optimally homogenized when the fluid has the second flow direction, thereby avoiding the effects of the fluid lateral force exerted on the valve core 3.

As stated above, the valve core 3 is located in the guide hole 22, and is movable in the axial direction of the guide hole 22. As shown in FIG. 1, a closing part 31 is provided on the valve core 3, and the valve core 3 can abut the conical portion 212 by means of the closing part 31 and thereby close the valve port formed by the cylindrical portion 211. A sealing ring 7 is further provided between the valve core 3 and the guide hole 22; the valve core 3 may be slidably inserted in the guide hole 22 by means of the sealing ring 7, and the sealing ring 7 divides the closed chamber formed by the housing of the actuating part 4 and the valve body 21 into two parts, with a chamber above the sealing ring 7 being a back-pressure chamber. An annular flow-expanding groove 32 arranged around the axis of the valve hole 21 may be provided on a sidewall of the valve core 3, so as to be located between the sealing ring 7 and the closing part 31 of the valve core. The configuration of the annular flow-expanding groove 32 enables the resistance presented to fluid by the valve core to be minimized when fluid is circulating, so that the flow speed of the fluid is further homogenized.

No specific restrictions are imposed on the depth of the annular groove in the present application. For example, the ratio of the radius of the valve core 3 at the annular flow-expanding groove 32 to the radius of the cylindrical portion 211 is 0.65-0.9. Via such a configuration, the valve core is enabled to have a certain strength and also further homogenize the fluid flow speed.

No specific restrictions are imposed on the structure of the sealing ring 7 in the present application; for example, the sealing ring 7 may be an O-ring seal, or may be a U-ring seal or Yring seal, or a sealing ring with Teflon material. An installation groove for the sealing ring 7 may be disposed on the valve core 3, or in the valve body 2.

As shown in FIG. 1, a pressure-equalizing pathway 33 is further provided on the valve core 3. The pressure-equalizing pathway 33 can connect the back-pressure chamber to the valve port formed by the cylindrical portion 211, so that the back-pressure chamber has the same pressure as the valve port. No specific restrictions are imposed on the structure of the pressure-equalizing pathway 33 in embodiments of the present application, as long as the pressure-equalizing pathway can connect the back-pressure chamber to the valve port.

The above are merely preferred embodiments of the present application, which are not intended to limit it. Any modifications, equivalent substitutions, etc. made within the spirit and principles of the present application should be included in the scope of protection of the present application.

What is claimed is:

1. A flow control valve, comprising:
   a valve body, having a valve hole, a guide hole and a lateral hole which are in communication with each other;
   a valve core, located in the guide hole, and movable in the axial direction of the guide hole so as to control the opening/closing of the valve hole, thereby allowing or blocking the flow of fluid between the valve hole and the lateral hole;
   a connecting portion connected to the valve hole being provided in the lateral hole, the connecting portion having a borehole surface formed by boring about the axis of the valve hole;
   wherein the valve hole comprises a cylindrical portion and a conical portion, the conical portion extending from the cylindrical portion to the connecting portion in a direction away from the axis of the valve hole; and
   wherein the conical portion comprises a first conical part, a second conical part and a third conical part, which are connected to each other in sequence starting at the cylindrical portion and have gradually increasing diameters, wherein the first conical part forms the seating face for the valve core;
   the angle between the second conical part and the axis of the valve hole is smaller than the angle between the third conical part and the axis of the valve hole, so as to provide different circulation areas at different degrees of opening of the valve core;
   the diameter of the end of the third conical part which is opposite the second conical part is equal to the diameter of the borehole surface.

2. The flow control valve as claimed in claim 1, wherein a seating face for the valve core is located at the conical portion.

3. The flow control valve as claimed in claim 2, wherein the axis of the valve hole is perpendicular to the axis of the lateral hole.

4. The flow control valve as claimed in claim 1, wherein the lateral hole is a blind hole, and the ratio of the radius of the blind hole to the radius of the cylindrical portion is 1.4-2.

5. The flow control valve as claimed in claim 4, wherein the axis of the valve hole is perpendicular to the axis of the lateral hole.

6. The flow control valve as claimed in claim 4, wherein the ratio of the radius of the blind hole to the radius of the cylindrical portion is 1.4-1.7.

7. The flow control valve as claimed in claim 6, wherein the axis of the valve hole is perpendicular to the axis of the lateral hole.

8. The flow control valve as claimed in claim 4, wherein the blind hole comprises a columnar part, and the ratio of the distance between the bottom of the columnar part and the axis of the valve hole to the radius of the cylindrical portion is 1.4-2.5.

9. The flow control valve as claimed in claim 8, wherein the ratio of the distance between the bottom of the columnar part and the axis of the valve hole to the radius of the cylindrical portion is 1.8-2.0.

10. The flow control valve as claimed in claim 9, wherein the axis of the valve hole is perpendicular to the axis of the lateral hole.

11. The flow control valve as claimed in claim 8, wherein the axis of the valve hole is perpendicular to the axis of the lateral hole.

12. The flow control valve as claimed in claim 1, wherein the ratio of the borehole radius corresponding to the borehole surface to the radius of the cylindrical portion is 1.3-2.

13. The flow control valve as claimed in claim 12, wherein the ratio of the borehole radius corresponding to the borehole surface to the radius of the cylindrical portion is 1.35-1.45.

14. The flow control valve as claimed in claim 1, wherein an annular flow-expanding groove arranged around the axis of the valve hole is provided on a sidewall of the valve core.

15. The flow control valve as claimed in claim 14, wherein the ratio of the radius of the valve core at the annular flow-expanding groove to the radius of the cylindrical portion is 0.65-0.9.

16. The flow control valve as claimed in claim 1, wherein the axis of the valve hole is perpendicular to the axis of the lateral hole.

* * * * *